(12) United States Patent
Dahling

(10) Patent No.: US 8,575,231 B2
(45) Date of Patent: Nov. 5, 2013

(54) ANTIFOULING COMPOSITION

(75) Inventor: Marit Dahling, Sandefjord (NO)

(73) Assignee: Jotun A/S, Sandefjord (NO)

( * ) Notice: Subject to any disclaimer, the term of this patent is extended or adjusted under 35 U.S.C. 154(b) by 113 days.

(21) Appl. No.: 12/866,045

(22) PCT Filed: Feb. 12, 2009

(86) PCT No.: PCT/EP2009/000991
§ 371 (c)(1),
(2), (4) Date: Oct. 1, 2010

(87) PCT Pub. No.: WO2009/100908
PCT Pub. Date: Aug. 20, 2009

(65) Prior Publication Data
US 2011/0034582 A1  Feb. 10, 2011

(30) Foreign Application Priority Data

Feb. 13, 2008  (NO) ................................... 20080774

(51) Int. Cl.
| C09D 5/16 | (2006.01) |
| C08K 5/11 | (2006.01) |
| C08K 5/34 | (2006.01) |
| C08K 5/41 | (2006.01) |
| C08K 5/58 | (2006.01) |
| C08K 3/10 | (2006.01) |
| C08K 3/22 | (2006.01) |

(52) U.S. Cl.
USPC .............. 523/122; 524/98; 524/99; 524/100; 524/102; 524/106; 524/169; 524/306; 524/310; 524/413; 524/431

(58) Field of Classification Search
USPC .............. 523/122; 524/98, 99, 100, 102, 106, 524/169, 306, 310, 413, 431
See application file for complete search history.

(56) References Cited

U.S. PATENT DOCUMENTS

| 4,208,511 A | 6/1980 | Jamiolkowski | |
| 5,412,062 A * | 5/1995 | Power et al. .................. | 528/272 |
| 2004/0253203 A1* | 12/2004 | Hossainy et al. .......... | 424/78.08 |
| 2006/0148977 A1* | 7/2006 | Finnie ........................... | 524/556 |
| 2007/0100123 A1* | 5/2007 | Hossainy et al. ............. | 528/272 |
| 2007/0123689 A1* | 5/2007 | Hossainy et al. ............. | 528/272 |

FOREIGN PATENT DOCUMENTS

| EP | 1505097 | 2/2005 |
| WO | WO2005/000939 | 1/2005 |
| WO | WO 2005/005516 | 1/2005 |

OTHER PUBLICATIONS

International Search Report and Combination Written Opinion in re PCT/EP2009/000991, mailed May 7, 2009.

* cited by examiner

*Primary Examiner* — Kriellion Sanders
(74) *Attorney, Agent, or Firm* — Gardner Groff Greenwald & Villanueva, PC

(57) ABSTRACT

The present invention relates to the use of polyoxalates as binders for antifouling coating compositions and antifouling coating compositions comprising the polyoxalates.

25 Claims, No Drawings

ANTIFOULING COMPOSITION

IN THE CROSS-REFERENCE TO RELATED APPLICATIONS

This application claims priority to Norwegian Application No. NO20080774, filed Feb. 13, 2008, which is hereby incorporated herein by reference in its entirety for all purposes.

The present invention relates to the use of polyoxalates as binders for antifouling coating compositions, to antifouling coating compositions comprising such binders and to certain preferred polyoxalates per se.

Surfaces that are submerged in seawater are subjected to fouling by marine organisms such as green and brown algae, barnacles, mussels, tube worms and the like. On marine constructions such as vessels, oil platforms, buoys, etc. such fouling is undesired and has economical consequences. The fouling may lead to biological degradation of the surface, increased load and accelerated corrosion. On vessels the fouling will increase the frictional resistance which will cause reduced speed and/or increased fuel consumption. It can also result in reduced manoeuvrability.

To prevent settlement and growth of marine organisms antifouling paints are used. These paints generally comprise a film-forming binder, together with different components such as pigments, fillers, solvents and biologically active substances.

The most successful antifouling coating system on the market until 2003 was a tributyltin (TBT) self-polishing copolymer system. The binder system for these antifouling coatings was a linear acrylic copolymer with tributyltin pendant groups. In seawater the polymer was gradually hydrolysed releasing tributyltin, which is an effective biocide. The remaining acrylic copolymer, now containing carboxylic acid groups, became sufficiently soluble or dispersible in seawater to be washed out or eroded away from the coating surface. This self-polishing effect provided a controlled release of the biologically active compounds in the coating resulting in the excellent antifouling efficiency and smooth surfaces and hence reduced frictional resistance.

The IMO Convention "International Convention on the Control of Harmful Anti-fouling Systems on Ships" of 2001 prohibited the application of new TBT containing antifouling coatings from 2003 and TBT containing antifouling coatings are prohibited on ship hulls from 2008.

In recent years new antifouling coating systems have been developed and introduced as a consequence of the TBT ban. One broad group of biocidal antifouling coatings on the market today is the self-polishing antifouling coatings which mimic the TBT self-polishing copolymer coatings. Those antifouling coatings are based on (meth)acrylic copolymers having pendant hydrolysable groups without biocidal properties. The hydrolysis mechanism is the same as in the TBT containing copolymers. This gives the same controlled dissolution of the polymers and thereby the controlled release of antifouling compounds from the coating film, resulting in similar performance as the TBT containing antifouling coating systems. The most successful self-polishing antifouling systems today are based on silyl ester functional (meth) acrylic copolymers. These coating compositions are for example described in, EP 0 646 630, EP 0 802 243, EP 1 342 756, EP 1 479 737, EP 1 641 862, WO 00/77102, WO 03/070832 and WO 03/080747.

The above mentioned antifouling coating systems degrade by hydrolysis of pendant groups on the polymer backbone, which results in a water erodable polymer. The hydrolysis of the pendant groups on the polymer backbone results in the formation of carboxylic acid salts which make the polymer hydrophilic and thereby erodable. A certain amount of hydrolysable groups are needed to get sufficient hydrophilicity and an erodable polymer after hydrolysis. One disadvantage of this technology is that the molecular weight of the polymer influences the erosion rate and high molecular weight polymers will have lower erosion rate due to entanglement of the polymer chains. Also, silyl ester copolymer technology is expensive.

Another way of obtaining water erodable polymers is by introducing hydrolysable groups in the polymer backbone, resulting in degradation of the polymer structure, which give erosion of the polymer film or coating film. Polyanhydrides are a class of polymers that degrade by backbone hydrolysis. The polyanhydrides are well documented for their surface degradation properties. Surface degradation is one of the most important factors for obtaining a successful antifouling coating. The use of specific aromatic polyanhydrides as binders in antifouling coating compositions is, for example, described in WO 2004/096927.

However, the anhydride group is extremely labile in the presence of moisture and it is therefore difficult to design a coating system based on polyanhydrides that exhibits a slow, controlled hydrolysis for use in antifouling coatings. Accordingly, the polyanhydrides used for antifouling coating compositions generally have a high content of aromatic units in order to control the hydrolysis.

We have surprisingly discovered that polyoxalates are a class of polymers that are suitable for use as binders in antifouling coatings. Coating films formed using polyoxalates exhibit the necessary surface degradation by degradation of the polymer backbone in the polyoxalate. Backbone hydrolysis in these compounds is more controlled than for the polyanhydrides. Because of the two adjacent carbonyl groups in the oxalate unit, the ester group is activated and labile towards hydrolysis. Polyoxalates have better solubility in common organic solvents than anhydrides and give more flexible coating films than the aromatic polyanhydrides employed in antifouling coating compositions.

The benefits of using self polishing binders which hydrolyse through the polymer backbone include the fact that erosion of crosslinked polymers and high molecular weight polymers becomes possible. One of the greatest advantages of the polyoxalate technology over the current commercial solution, silyl technology, is that the cost of the binder is much lower. Polyoxalates also allow the formation of anti-fouling coatings in which it is easier to meet the legislation in terms of VOC (volatile organic compounds) content. It is now highly preferred that any anti-fouling coating has a VOC content of less than 400 g/L. This is more easily achieved with polyoxalate binder than with the binder system based on silyl copolymers.

Polyoxalates are not new compounds. In EP-A-1505097 various polyoxalates are mentioned as being suitable for the formation of shaped articles or films. Many other documents describe the formation of various polyoxalates but no-one before has appreciated the utility of these compounds as self-polishing binders in anti-fouling coating compositions for marine based articles.

The object of the present invention is to provide an antifouling coating composition which can be applied by common application methods, e.g. by painting or spraying the coating composition onto the surface in question. The invention also provides antifouling coating films with good mechanical properties, controlled self-polishing properties and good antifouling performance. These objectives are attained by the use of polyoxalates as the binder in the antifouling coating composition.

Thus, viewed from one aspect the invention provides the use of at least one polyoxalate as a binder in an anti-fouling coating composition.

Viewed from another aspect the invention provides a binder for use in antifouling coating compositions wherein the binder comprises polyoxalates.

Viewed from another aspect the invention provides an antifouling coating composition comprising at least one polyoxalate and at least one other component. In particular the invention provides an antifouling coating composition comprising at least one polyoxalate and a solvent. Also, the invention provides an antifouling coating composition comprising at least one polyoxalate and at least one biologically active agent.

Viewed from another aspect the invention provides a process for protecting an to object from fouling comprising coating at least a part of said object which is subject to fouling with an anti-fouling coating composition as hereinbefore described.

Viewed from another aspect the invention provides an object coated with an anti-fouling coating composition as hereinbefore defined.

The term binder is a term of this art. The binder is the actual film forming component of an anti-fouling composition. The binder imparts adhesion and binds the components of the composition together.

The at least one polyoxalate which is used in the invention may be a linear or branched polymer. It is preferably a copolymer, e.g. a random copolymer or block copolymer. The repeating units of the polyoxalate can be saturated and/or unsaturated aliphatic and/or cycloaliphatic units and/or aromatic units. The repeating units can be unsubstituted or substituted. It will be appreciated that any polyoxalate of the invention comprises at least two oxalate units, preferably at least 5 oxalate units, e.g. at least 8 oxalate units.

The polyoxalate of the invention will preferably be formed from the polymerisation of at least one oxalate monomer and at least one diol monomer.

The polyoxalates of the present invention can be prepared by condensation polymerisation using any of various methods known and used in the art. Examples of common polycondensation reactions include direct esterification reaction between oxalic acid and diols; transesterification reaction between dialkyl oxalates and diols; reaction in solution between oxalyl chloride with diols; and interfacial condensation reaction between oxalyl chloride and diols or alkali salts of diols or between alkali salts of oxalic acid, such as sodium oxalate or potassium oxalate, and diols. The polycondensation reactions can be carried out as melt or in solution. The polymerisation can be performed under melt polycondensation condition or in solution.

Optionally the polycondensation is carried out in the presence of a catalyst. The catalyst preferably comprises at least one member selected from compounds of magnesium, calcium, titanium, zirconium, vanadium, manganese, iron, cobalt, zinc, aluminium, germanium, tin, phosphorus and antimony. Among the compounds organometallic compounds are preferred, more preferably organic titanium compounds and organic tin compounds. Examples of organic titanium compounds include titanium alkoxides, such as triisopropyl titanate, titanium tetraisopropoxide, titanium glycolates, titanium butoxide, hexyleneglycol titanate and tetraisooctyl titanate. Examples of organic tin compounds include tin 2-ethylhexanoate, dibutyltin dilaurate, monobutyltin tris (2-ethylhexanoate), dibutyltin oxide, dioctyltin oxide and monobutyltin oxide.

The starting materials for the preparation of polyoxalates depend on the polymerisation process as indicated in the above mentioned polymerisation processes. The polyoxalates are however formed from oxalic acid or a derivative thereof, i.e. an oxalate monomer. By derivative thereof is meant a mono or diester thereof, a mono or diacid halide (e.g. chloride) thereof, or salt thereof, e.g. alkali metal salt thereof. Ideally any derivative is one of the oxalic compounds mentioned below.

The oxalate monomer used in the polymerisation reaction may be an ester of oxalic acid, especially a diester. Esters may be alkyl esters, alkenyl esters or aryl esters. Examples of suitable dialkyl oxalates for the preparation of polyoxalates include dimethyl oxalate, diethyl oxalate, dipropyl oxalate and dibutyl oxalate.

Throughout this application, any alkyl group may have 1-10 carbon atoms, preferably 1 to 6 carbon atoms. Any alkenyl group may have 2-10 carbon atoms, preferably 2 to 6 carbon atoms. Any aryl group may have 6-20 carbon atoms, preferably 6 to 10 carbon atoms. Any cyclic group may have 3-20 carbon atoms, preferably 4-15 carbon atoms especially 5 to 10 carbon atoms.

Dialkyl oxalates are preferred.

Other preferred oxalate monomers are oxalic acid, oxalyl chloride, and salts of oxalic acid, e.g. alkali metal salts thereof, such as sodium oxalate or potassium oxalate.

It is within the scope of the invention for a mixture of oxalate monomers to be used in the preparation of the polyoxalates of the invention. Where a mixture is employed, the use of two dialkyl oxalates is preferred. Ideally however, only one oxalate monomer is used in the polymerisation reaction.

Examples of diols for the preparation of polyoxalates include saturated aliphatic and saturated cycloaliphatic diols, unsaturated aliphatic diols or aromatic diols. Linear or branched saturated aliphatic diols are preferred.

Preferred diols include $C_{3-20}$ aliphatic or $C_{4-20}$-cycloaliphatic diols such as 1,3-propanediol, 1,2-butanediol, 1,3-butanediol, 1,4-butanediol, 2,3-butanediol, 1,2-pentanediol, 1,4-pentanediol, 1,5-pentanediol, 2,4-pentanediol, 1,2-hexanediol, 1,5-hexanediol, 1,6-hexanediol, 2,5-hexanediol, 1,7-heptanediol, 1,2-octanediol, 1,8-octanediol, 1,9-nonanediol, 1,10-decanediol, 1,2-dodecanediol, 1,12-dodecanediol, 1,14-tetradecanediol, 1,2-hexadecanediol, 1,16-hexadecanediol, 2,2-dimethyl-1,3-propanediol (neopentyl glycol), 3-methyl-1,3-butanediol, 3-methyl-1,5-pentanediol, 2-methyl-2,4-pentanediol, 2,3-dimethyl-2,3-butanediol, 2,2-diethyl-1,3-propanediol, 2,4-dimethyl-2,4-pentanediol, 2-methyl-2-propyl-1,3-propanediol, 2,2,4-trimethyl-1,3-pentanediol, 2,5-dimethyl-2,5-hexanediol, 2-ethyl-1,3-hexandiol, 2-butyl-2-ethyl-1,3-propanediol, 2,2-dibutyl-1,3-propanediol, 1,2-cyclohexanediol, 1,3-cyclohexanediol, 1,4-cyclohexandiol, 1,2-cyclohexanedimethanol, 1,4-cyclohexanedimethanol, cyclododecanediol, dipropylene glycol, triethylene glycol, pentaethylene glycol, hexaethylene glycol and hydroxypivalyl hydroxypivalate and mixtures thereof. Preferred diols are $C_{3-10}$ aliphatic or $C_{5-10}$-cycloaliphatic diols.

The most preferred diols are 2-butyl-2-ethyl-1,3-propanediol, 2,2,4-trimethyl-1,3-pentanediol, 4-cyclohexanedimethanol, 1,3-cyclohexanedimethanol, and neopentyl glycol and mixtures thereof.

In particular it is preferred if at least one diol used to manufacture the polyoxalates of the invention is a saturated aliphatic branched diol having up to 20 carbon atoms, e.g.

5-15 carbon atoms. Preferably at least two saturated branched diols are used or a mixture of a linear or cyclic saturated diol and a saturated branched diol.

If a branched diol is employed this preferably forms at least 50 wt % of the diol component used in the polymerisation reaction.

Preferred unsaturated aliphatic diols are C4-20 unsaturated aliphatic diols such as 2-butene-1,4-diol, 3-butene-1,2-diol, 3-hexene-1,6-diol and monoolein.

Preferred aromatic diols are C6-20 aromatic diols such as hydroquinone, methylhydroquinone, resorcinol, 2-methylresorcinol, pyrocatechol, 1,2-benzenedimethanol, 1,3-benzenedimethanol, 1,4-benzenedimethanol, bisphenol A, bisphenol E, bisphenol F, bisphenol M, bisphenol P, bisphenol S, bisphenol Z, bisphenol AF, bisphenol AP, 4,4'-dihydroxybenzophenone, 4,4'-biphenol, 2,2'-biphenol, 1,2-dihydroxynaphthalene, 1,4-dihydroxynaphthalene, 1,5-dihydroxynaphthalene, 1,6-dihydroxynaphthalene, 1,7-dihydroxynaphthalene, 2,3-dihydroxynaphthalene, 2,6-dihydroxynaphthalene, 2,7-dihydroxynaphthalene, and 1,8-naphthalenedimethanol;

The above mentioned diols can be used alone or in combination of two or more diols. Preferably a mixture of two or more diols is used to manufacture the polyoxalates of the invention.

The starting materials for the preparation of the polyoxalates are preferably used in a molar ratio between the oxalic acid or derivative(s) thereof and the diol(s) of less than 2 and more than 0.5, more preferred not above 1.0. In some embodiments, especially where the polyoxalate will be cured in use, the diols are in excess. In other embodiments, especially where the coating is a physical drying coating, the oxalate monomers will be in excess.

Preferably the polyoxalates are prepared from aliphatic or cycloaliphatic diols. Aliphatic or cycloaliphatic diols preferably form therefore at least 50 mol %, preferably at least 75 mol %, optionally 100 mol % of the total diols used to form the polyoxalate.

The amount of aromatic diols should preferably be 50 mol % or less of the total amount of diols, more preferably less than 25 mol % or less and most preferably 10 mol % or less. The amount of unsaturated aliphatic diols should preferably be 10 mol % or less of the total amount of diols.

The polyoxalate polymer architecture will influence the polymer properties. Branching in polymers and "star" shaped polymers are examples of useful structural variables that can be used advantageously to modify polymer properties such as solubility in organic solvents, miscibility in polymer blends and mechanical properties.

In order to obtain branching or star structure in the polyoxalates, the polycondensation is carried out in the presence of a compound with more than two functional groups, e.g. three functional groups that can take part in the polymerisation reaction. Examples of suitable compounds include polyols, e.g. C3-20 polyols such as glycerol, trimethylolmethane, trimethylolethane, trimethylolpropane, 1,2,4-butanetriol, 1,2,6-hexanetriol, erythritol, pentaerythritol, di(trimethylolpropane) 1,2,7,8-octanetetrol triglycerol, dipentaerythritol, pyrogallol and phloroglucinol;

polycarboxylic acids, e.g. C4-20 polycarboxylic acids such as trimellitic acid, trimesic acid and pyromellitic acid;

alkyl esters of polycarboxylic acid such as trimethyl trimellitate; and anhydrides of polycarboxylic acid such as trimellitic anhydride and pyromellitic dianhydride. The term "poly" is used in relation to these branching monomers to mean the presence of 3 or more functional groups (i.e. acid groups, hydroxyl groups etc) in the molecule. These groups therefore allow the formation of a polymeric side chain off the polymer backbone.

Examples of other suitable polyfunctional compounds include malic acid, tartaric acid and citric acid.

Polyols with more than two hydroxyl groups are the preferred compounds for obtaining branched and star-shaped polyoxalates. The amount of any branching reactant, e.g. polyol should preferably be 10 mol % or less of the total amount of that reactant type, e.g. of the diols/polyols combined. Too much branching leads to gelling and a composition which cannot be applied to an object.

Optionally other functional compounds can be included as comonomers to adjust the polymer properties of the polyoxalates. Such compounds can be used to adjust parameters such as hydrolysis rate and mechanical properties. These functional compounds preferably possess two reactive functional groups e.g. two ester, acid, amino or hydroxyl groups or mixtures thereof and will be called bifunctional compounds. These compounds can form additional monomers in the polymerisation process. Examples of suitable bifunctional compounds include:

alkyl esters of dicarboxylic acids such as dimethyl terephthalate, dimethyl isophthalate, dimethyl phthalate, dimethyl malonate, dimethyl isobutylmalonate, dimethyl succinate, dimethyl glutarate, dimethyl adipate, dimethyl pimelate, dimethyl suberate, dimethyl azelate, dimethyl sebacate, dimethyl brassylate, dimethyl glutaconate, diethyl malonate, diethyl methylmalonate, diethyl succinate, diethyl glutarate, diethyl adipate, diethyl pimelate, diethyl suberate, diethyl azelate, diethyl sebacate, dibutyl succinate, dibutyl adipate and dibutyl sebacate;

dicarboxylic acids such as terephthalic acid, isophthalic acid, phthalic acid, 1,4-phenylenediacetic acid, 1,3-phenylenediacetic acid, 1,2-phenylenediacetic acid, cyclohexanedicarboxylic acid, maleic acid, fumaric acid, malonic acid, isobutylmalonic acid, succinic acid, glutaric acid, adipic acid, pimelic acid, suberic acid, azelaic acid, sebacic acid, dodecanoic acid, brassylic acid, glutaconic acid and dimer fatty acids;

dicarboxylic acid anhydrides such as succinic anhydride, maleic anhydride, citraconic anhydride, glutaric anhydride, diglycolic anhydride, phthalic anhydride, tetrahydrophthalic anhydride, hexahydrophthalic anhydride, 5-norbornene-2,3-dicarboxylic anhydride and 1,8-naphthalic anhydride;

alkyl esters of hydroxyl functional carboxylic acids such as, methyl 3-hydroxybenzoate, methyl 4-hydroxybenzoate, methyl vanillate, methyl 4-hydroxyphenylacetate, ethyl 3-hydroxybenzoate, ethyl 4-hydroxybenzoate, methyl 3-hydroxybutyrate, methyl 2-hydroxyisobutyrate, methyl 10-hydroxydecanoate, ethyl 3-hydroxybutyrate, ethyl 2-hydroxyisobutyrate, ethyl 2-hydroxyhexanoate and ethyl 6-hydroxyhexanoate;

hydroxyl functional carboxylic acids such as salicylic acid, 3-hydroxybenzoic acid, 4-hydroxybenzoic acid, vanillic acid, 2-hydroxyphenylacetic acid, 3-hydroxyphenylacetic acid, 4-hydroxyphenylacetic acid, glycolic acid, 3-hydroxybutyric acid, 2-hydroxyisobutyric acid and ricinoleic acid;

diamines such as 1,2-ethanediamine, 1,2-propanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,12-dodecanediamine, 2-methyl-1,5-pentanediamine, 2-butyl-2-ethyl-1,5-pentanediamine, 2,2,4- and 2,4,4-trimethyl-1,6-hexanediamine, O,O'-bis(3-aminopropyl)ethylene glycol, O,O'-bis(3-aminopropyl)diethylene glycol, 1,2-diaminocyclohexane, 1,4-diaminocyclohexane, 1,2-phenylenediamine, 1,3-phenylenediamine, 1,4-phenylenediamine, 1,3-bis(aminomethyl)benzene, 1,4-bis(aminomethyl)benzene, 1,4-diaminonaphthalene, 1,5-diaminonaphthalene, 1,8-diaminonaphthalene, 4,4'-methylenedianiline, 4,4'-oxydianiline and 1,1,1-tris(aminomethyl)ethane.

Any alkyl ester of dicarboxylic acid, dicarboxylic acid anhydrides, diamines, hydroxyl functional carboxylic acid, alkyl ester of hydroxyl functional carboxylic acid or dicarboxylic acid used herein may have up to 20 carbon atoms.

A particularly preferred combination of use in the manufacture of polyoxalates of the invention is that of an oxalate monomer and a bifunctional compound as hereinbefore defined. Most especially that bifunctional compound will contain at least one carboxylic acid group or ester thereof, preferably two carboxylic acid groups or esters thereof. An especially preferred reactant combination is therefore an oxalate monomer and an alkyl ester of dicarboxylic acid, dicarboxylic acid anhydride or dicarboxylic acid.

Polyoxalate copolymers are obtained by mixing all starting materials before polymerisation. By mixing all reactants, the polyoxalate which forms is typically a statistical random polymer of all the monomers used (i.e. the amount of each monomer incorporated essentially reflects the amount of each monomer in the starting mixture). Polyoxalate block polymers are obtained either by subsequent addition of starting materials during the polymerisation process after an initial polymerisation of only two monomers or preparation of block polymers that are linked together.

The polymerisation conditions can be widely varied although typically temperatures of 100 to 250° C. are employed, e.g. 150 to 220° C. During condensation polymerisation a condensate (normally water or an alcohol) is formed. This is preferably removed by distillation during as the polymerisation continues. This can be achieved under reduced pressure. The polymerisation is preferable carried out in an inert atmosphere, e.g. nitrogen.

The polyoxalates of the present invention preferably have a number average molecular weight (Mn) from 1,000 to 100,000 more preferably 1000 to 40,000, especially 1000 to 10,000.

The polyoxalates of the present invention preferably have a weight average molecular weight (Mw) from 1,000 to 200,000, e.g. from 1,000 to 100,000 more preferably 1000 to 40,000, especially 1000 to 25000. In some embodiments the Mw may be 10,000 to 40,000, e.g. 20,000 to 40,000.

In particular, for physical drying coatings, the Mw should preferably be 20,000-40,000. This ensures the formation of good film properties and maintains an acceptable solubility. For curing systems the Mw should preferably be 1,000-10,000.

In a further preferred embodiment of the invention, the polyoxalate is amorphous. By amorphous is meant that the polyoxalate does not have a discernable melting point, i.e. it is not crystalline. The use of an amorphous polyoxalate increases solubility in the organic solvent typically used in the anti-fouling composition so the use of amorphous polyoxalates is preferred. It is remarkable however that such amorphous polymers can be used successfully as self-polishing binders in anti-fouling coating compositions.

Whilst some polyoxalates are known in the art for use in other fields, some of the polyoxalates suitable for use in this invention are new and form a further aspect of the invention.

Thus, viewed from another aspect the invention provides a polyoxalate obtainable by the condensation polymerisation of at least one oxalic acid or derivative thereof and at least two diols wherein at least one of said diols is a saturated branched diol having up to 20 carbon atoms.

Highly preferably at least two saturated branched diols are used or a mixture of a linear or cyclic saturated diol and a saturated branched diol. Any diol may have up to 20 carbon atoms, e.g. up to 10 carbon atoms. Preferred diols are listed above.

In one embodiment, the at least one polyoxalate acts as a binder in a physical drying antifouling coating composition, i.e. antifouling coating compositions which are dried by evaporation of volatile components, such as solvents. These compositions are typically free of curing agents. In a physical drying coating the solubility of the binder is important. The polyoxalate of such a coating composition has to be highly soluble in the organic solvent used in order to allow formation of a coating composition with a suitable solids content and suitable properties for application by common methods.

It is therefore preferred that any polyoxalate used in this invention has a solubility of at least 50 wt % in the solvent used in the antifouling composition, preferably at least 75 wt % in the solvent such as at least 95 wt % in the solvent. For example therefore at least 1 kg of polyoxalate should dissolve in 1 kg of solvent. Preferred solvents are discussed below. Xylene is especially preferred.

It is preferred therefore if the at least one polyoxalate forms at least 3 wt %, e.g. at least 5 wt %, perhaps at least 10 wt % of the anti-fouling coating composition. The skilled man will appreciate that the level of polyoxalate binder employed will depend on the amount of anti-fouling compound employed, e.g. the amount of cuprous oxide.

The solubility of the polyoxalates can, for example, be improved by using flexible building blocks and/or by branching of the polymer by using multifunctional building blocks, in particular the bifunctional building blocks as discussed above.

In another embodiment, the present invention relates to the use of polyoxalates as binders in curable antifouling coating compositions. Polyoxalates have functional end groups that are reactive with curing agents such as chain extenders or crosslinkers. The resulting cured coating film will generally have improved hydrolysis and mechanical properties. Curable coatings are often used to provide an antifouling coating composition with reduced levels of volatile organic compounds (VOC) and sufficiently low viscosity in order to be applied by common application methods.

The functionality of the end-groups will depend on the starting materials, the ratio between the starting materials and the process for preparation. The end groups can easily be modified to other functional groups suitable for a wide range of curing reactions. Examples of curable end groups include hydroxyl groups, ethylenically unsaturated groups and epoxy groups.

Polyoxalates, especially those prepared with excess of diols in the polycondensation reaction, can have hydroxyl end-groups. These end-groups are reactive with curing agents such as monomeric isocyanates, polymeric isocyanates and isocyanate prepolymers.

Epoxy groups may be introduced, for example, by reacting hydroxyl groups in the polyoxalate with epichlorohydrin.

Ethylenically unsaturated groups such as (meth)acrylate groups may be introduced, for example, by reacting the hydroxyl groups in the polyoxalate with ethylenically unsaturated carboxylic acids, such as acrylic acid or methacrylic acid.

The term polyoxalate is used herein therefore to cover compounds which either inherently contain curable end groups or are modified to contain curable end groups. Compounds which have been modified to contain curable end groups may be referred to specifically as end group modified polyoxalates.

It will be appreciated that mixing of antifouling coating and curing agent is carried out shortly before application of the coating to an object, e.g. an hour or less before coating. It is preferred therefore if the curing agent is supplied separately to the rest of the anti-fouling coating to prevent curing before the coating has been applied to the object. Hence the coating composition of the invention can be supplied as a multipack (preferably two pack) formulation.

Viewed from another aspect therefore the invention provides a kit comprising (I) an anti-fouling coating composition comprising at least one polyoxalate e.g. as described herein and (II) at least one curing agent.

It is also believed that none before has manufactured a self-polishing antifouling coating composition which is curable and has been cured. Viewed from another aspect therefore the invention provides a self-polishing anti-fouling coating composition which is curable or which has been cured.

The term self-polishing coating is a term of the art and used herein to mean an erodable and hydrolysable coating.

Hence, whilst the curable antifouling coating compositions can be a one pack system, it is preferably a multi pack system. It would be supplied with instructions on mixing the components shortly before application.

It is preferred therefore if the anti-fouling coating composition is supplied free of any curing agent. During application and once applied however, it is preferred if the anti-fouling coating composition includes a curing agent.

The antifouling coating composition of the invention should preferably have solids content above 45 wt %, e.g. above 50% by weight, such as above 55 wt %, preferably above 60 wt %.

More preferably the antifouling coating composition should have a content of volatile organic compounds (VOC) below 400 g/L, e.g. below 390 g/L. The VOC content can be measured on an anti-fouling coating having a curing agent added thereto or without such a curing agent. Where a curing agent is used, it is preferred if the VOC content of the mixture incorporating the curing agent is less than 400 g/L, more preferably less than 375 g/L, especially less than 350 g/L. VOC content can be calculated (ASTM D5201-01) or measured, preferably measured.

The polyoxalates of the present invention will degrade in sea water and release compounds with structural units similar or identical to the starting materials. Starting materials which are biologically active towards marine organisms may give polyoxalates which act as anti-fouling agents themselves. Preferably however, the starting materials are chosen from compounds that give polyoxalates that degrade to components that are not biologically active towards marine organisms. In such a scenario, the anti-fouling coating composition of the invention will need to contain at least one compound capable of preventing fouling on an object, e.g. a biologically active agent especially a biocide.

The antifouling coating composition of the present invention comprises at least one polyoxalate and at least one additional component.

The antifouling coating composition of the present invention preferably comprises one or more biologically active agents. Even if the antifouling coating composition of the present invention comprises a biologically active polyoxalate, it may additionally contain one or more biologically active agents.

Viewed from another aspect therefore the invention provides an anti-fouling coating composition comprising a polyoxalate as hereinbefore defined and at least one biologically active agent, preferably a biocide.

By biologically active agent/compound is meant any chemical compound that prevents the settlement of marine organisms on a surface, and/or prevents the growth of marine organisms on a surface and/or encourages the dislodgement of marine organisms from a surface. Examples of inorganic biologically active compounds include copper and copper compounds such as copper oxides, e.g. cuprous oxide and cupric oxide; copper alloys, e.g. copper-nickel alloys; copper salts, e.g. copper thiocyanate, copper sulphide; and barium metaborate.

Examples of organometallic biologically active compounds include zinc pyrithione; organocopper compounds such as copper pyrithione, copper acetate, copper naphthenate, oxine copper, copper nonylphenolsulfonate, copper bis(ethylenediamine)bis(dodecylbenzensulfonate) and copper bis(pentachlorophenolate); dithiocarbamate compounds such as zinc bis(dimethyldithiocarbamate), zinc ethylenebis(dithiocarbamate), manganese ethylenebis(dithiocarbamate) and manganese ethylene bis(dithiocarbamate) complexed with zinc salt;

Examples of organic biologically active compounds include heterocyclic compounds such as 2-(tert-butylamino)-4-(cyclopropylamino)-6-(methylthio)-1,3,5-triazine, 4,5-dichloro-2-n-octyl-4-isothiazolin-3-one, 1,2-benzisothiazolin-3-one, 2-(thiocyanatomethylthio)-1,3-benzothiazole and 2,3,5,6-tetrachloro-4-(methylsulphonyl)pyridine; urea derivatives such as 3-(3,4-dichlorophenyl)-1,1-dimethylurea; amides and imides of carboxylic acids, sulphonic acids and sulphenic acids such as N-(dichlorofluoromethylthio)phthalimide, N-dichlorofluoromethylthio-N',N'-dimethyl-N-phenylsulfamide, N-dichlorofluoromethylthio-N',N'-dimethyl-N-p-tolylsulfamide and N-(2,4,6-trichlorophenyl)maleimide; other organic compounds such as pyridine triphenylborane, amine triphenylborane, 3-iodo-2-propynyl N-butylcarbamate, 2,4,5,6-tetrachloroisophthalonitrile and p-((diiodomethyl)sulphonyl)toluene.

Other examples of biologically active agents may be tetraalkylphosphonium halogenides, guanidine derivatives, imidazole containing compounds such as medetomidine and derivatives and enzymes such as oxidase, proteolytically, hemicellulolytically, cellulolytically, lipolytically and amylolytically active enzymes.

Optionally the biologically active compounds may be encapsulated or adsorbed on an inert carrier or bonded to other materials for controlled release.

The biologically active compounds may be used alone or in mixtures. The use of these biologically active agents is known in anti-fouling coatings and their use would be familiar to the skilled man.

The total amount of biologically active agent in the antifouling compositions of the invention may be in the range 0.5 to 80 wt %, such as 1 to 70 wt %. It will be appreciated that the amount of this component will vary depending on the end use and the biologically active compound used.

In addition to the polyoxalates and biologically active compounds the antifouling coating composition according to the present invention optionally comprise one or more components selected among other binders, pigments, extenders and fillers, dehydrating agents and drying agents, additives, solvents and thinners.

An additional binder can be used to adjust the self-polishing properties and the mechanical properties of the antifouling coating film. Examples of binders that can be used in addition to the polyoxalate in the antifouling coating composition according to the present invention include rosin materials such as wood rosin, tall oil rosin and gum rosin;

rosin derivatives such as hydrogenated and partially hydrogenated rosin, disproportionated rosin, dimerised rosin, polymerised rosin, maleic acid esters, fumaric acid esters and other esters of rosin and hydrogenated rosin, copper resinate, zinc resinate, calcium resinate, magnesium resinate and other metal resinates of rosin and polymerised rosin and others as described in WO 97/44401;

resin acids and derivatives thereof such as copal resin and sandarach resin; other carboxylic acid containing compounds such as abietic acid, neoabietic acid, dehydroabietic acid, dihydroabietic acid, tetrahydroabietic acid, secodehydroabietic acid, pimaric acid, paramatrinic acid, isoprimaric acid, levoprimaric acid, agathenedicarboxylic acid, sandaracopimalic acid, lauric acid, stearic acid, isostearic acid, oleic acid, linoleic acid, linolenic acid, isononanoic acid, versatic acid, naphthenic acid, tall oil fatty acid, coconut oil fatty acid, soybean oil fatty acid and derivatives thereof;

silyl ester copolymers, for example as described in U.S. Pat. No. 4,593,055, EP 0 646 630 and NO 2007 3499;

acid functional polymers of which the acid group is blocked with divalent metals bonded to a monovalent organic residue, for example as described in EP 0 204 456 and EP 0 342 276; or divalent metals bonded to a hydroxyl residue, for example as described in GB 2 311 070 and EP 0 982 324; or amine for example as described in EP 0 529 693;

hydrophilic copolymers for example (meth)acrylate copolymers as described in GB 2 152 947 and poly(N-vinyl pyrrolidone) copolymers and other copolymers as described in EP 0 526 441;

(meth)acrylic polymers and copolymers, such as poly(n-butyl acrylate), poly(n-butyl acrylate-co-isobutyl vinyl ether);

vinyl ether polymers and copolymers, such as poly(methyl vinyl ether), poly(ethyl vinyl ether), poly(isobutyl vinyl ether), poly(vinyl chloride-co-isobutyl vinyl ether);

aliphatic polyesters, such as poly(lactic acid), poly(glycolic acid), poly(2-hydroxybutyric acid), poly(3-hydroxybutyric acid), poly(4-hydroxyvaleric acid), polycaprolactone and aliphatic polyester copolymer containing two or more of the units selected from the above mentioned units;

metal containing polyesters for example as described in EP 1 033 392 and EP 1 072 625;

alkyd resins and modified alkyd resins; and other condensation polymers as described in WO 96/14362.

Dehydrating agents and drying agents contribute to the storage stability of the antifouling coating composition by removing moisture introduced from raw materials, such as pigments and solvents, or water formed by reaction between carboxylic acid compounds and bivalent and trivalent metal compounds in the antifouling coating composition. The dehydrating agents and drying agents that may be used in the antifouling coating composition according to the present invention include organic and inorganic compounds. Examples of dehydrating agents and drying agents include anhydrous calcium sulphate, anhydrous magnesium sulphate, anhydrous sodium sulphate, anhydrous zinc sulphate, molecular sieves and zeolites; orthoesters such as trimethyl orthoformate, triethyl orthoformate, tripropyl orthoformate, triisopropyl orthoformate, tributyl orthoformate, trimethyl orthoacetate and triethyl orthoacetate; ketals; acetals; enolethers; orthoborates such as trimethyl borate, triethyl borate, tripropyl borate, triisopropyl borate, tributyl borate and tri-tert-butyl borate; silicates such as trimethoxymethyl silane, tetraethyl silicate and ethyl polysilicate; and isocyanates, such as p-toluenesulfonyl isocyanate.

The preferred dehydrating agents and drying agents are the inorganic compounds.

Examples of pigments are inorganic pigments such as titanium dioxide, iron oxides, zinc oxide, zinc phosphate, graphite and carbon black; organic pigments such as phthalocyanine compounds and azo pigments.

Examples of extenders and fillers are minerals such as dolomite, plastorite, calcite, quartz, barite, magnesite, aragonite, silica, wollastonite, talc, chlorite, mica, kaolin and feldspar; synthetic inorganic compounds such as calcium carbonate, magnesium carbonate, barium sulphate, calcium silicate and silica; polymeric and inorganic microspheres such as uncoated or coated hollow and solid glass beads, uncoated or coated hollow and solid ceramic beads, porous and compact beads of polymeric materials such as poly(methyl methacrylate), poly(methyl methacrylate-co-ethylene glycol dimethacrylate), poly(styrene-co-ethylene glycol dimethacrylate), poly(styrene-co-divinylbenzene), polystyrene, poly(vinyl chloride).

Examples of additives that can be added to an antifouling coating composition are reinforcing agents, thixotropic agents, thickening agents, anti-settling agents, plasticizers and solvents.

Examples of reinforcing agents are flakes and fibres. Fibres include natural and synthetic inorganic fibres such as silicon-containing fibres, carbon fibres, oxide fibres, carbide fibres, nitride fibres, sulphide fibres, phosphate fibres, mineral fibres; metallic fibres; natural and synthetic organic fibres such as cellulose fibres, rubber fibres, acrylic fibres, polyamide fibres, polyimide, polyester fibres, polyhydrazide fibres, polyvinylchloride fibres, polyethylene fibres and others as described in WO 00/77102. Preferably, the fibres have an average length of 25 to 2,000 μm and an average thickness of 1 to 50 μm with a ratio between the average length and the average thickness of at least 5.

Examples of thixotropic agents, thickening agents and anti-settling agents are silicas such as fumed silicas, organo-modified clays, amide waxes, polyamide waxes, amide derivatives, polyethylene waxes, oxidised polyethylene waxes, hydrogenated castor oil wax, ethyl cellulose, aluminium stearates and mixtures of thereof.

Examples of plasticizers are chlorinated paraffins, phthalates, phosphate esters, sulphonamides, adipates and epoxidised vegetable oils.

In general, any of these optional components can be present in an amount ranging from 0.1 to 50 wt %, typically 0.5 to 20 wt %, preferably 0.75 to 15 wt % of the antifouling composition. It will be appreciated that the amount of these optional components will vary depending on the end use It is highly preferred if the antifouling composition contains a solvent. This solvent is preferably volatile and is preferably organic. It may have an evaporation rate of more than 0.05 (n-BuAc=1). Examples of organic solvents and thinners are aromatic hydrocarbons such as xylene, toluene, mesitylene; ketones methyl ethyl ketone, methyl isobutyl ketone, methyl isoamyl ketone, cyclopentanone, cyclohexanone; esters such as butyl acetate, tert-butyl acetate, amyl acetate, isoamyl acetate, ethylene glycol methyl ether acetate; ethers such as ethylene glycol dimethyl ether, diethylene glycol dimethyl ether, dibutyl ether, dioxane, tetrahydrofuran, alcohols such as n-butanol, isobutanol, benzyl alcohol; ether alcohols such as butoxyethanol, 1-methoxy-2-propanol; aliphatic hydrocarbons such as white spirit; and optionally a mixture of two or more solvents and thinners.

Preferred solvents are aromatic solvents, especially xylene and mixtures of aromatic hydrocarbons.

The amount of solvent is preferably as low as possible but is preferably sufficient to dissolve the at least one polyoxalate. The solvent content may be up to 50 wt % of the composition, preferably up to 45 wt % of the composition, such as up to 40 wt % but may be as low as 15 wt % or less, e.g. 10 wt % or less. Again, the skilled man will appreciate that the solvent content will vary depending on the other components present and the end use of the coating composition.

Alternatively the coating can be dispersed in an organic non-solvent for the film-forming components in the coating composition or in an aqueous dispersion.

The antifouling coating composition of the invention can be applied to a whole or part of any object surface which is subject to fouling. The surface may be permanently or intermittantly underwater (e.g. through tide movement, different cargo loading or swell). The object surface will typically be the hull of a vessel or surface of a fixed marine object such as an oil platform or buoy. Application of the coating composition can be accomplished by any convenient means, e.g. via painting (e.g. with brush or roller) or spraying the coating onto the object. Typically the surface will need to be separated from the seawater to allow coating. The application of the coating can be achieved as conventionally known in the art.

The invention will now be defined with reference to the following non limiting examples.

Determination of Polymer Solution Viscosity

The viscosity of the polymers are determined in accordance with ASTM D2196 using a Brookfield DV-I viscometer with LV-2 or LV-4 spindle at 12 rpm. The polymers are temperated to 23.0° C.±0.5° C. before the measurements.

Determination of Solids Content of the Polymer Solutions

The solids content in the polymer solutions are determined in accordance with ISO 3251. A test sample of 0.6 g±0.1 g are taken out and dried in a ventilated oven at 150° C. for 30 minutes. The weight of the residual material is considered to be the non-volatile matter (NVM). The non-volatile matter content is expressed in weight percent. The value given is the average of three parallels.

Determination of Polymer Average Molecular Weights Distribution

The polymers are characterised by Gel Permeation Chromatography (GPC) measurement. The molecular weight distribution (MWD) was determined using a Polymer Laboratories PL-GPC 50 instrument with two PLgel 5 μm Mixed-D columns from Polymer Laboratories in series, tetrahydrofuran (THF) as eluent at ambient temperature and at a constant flow rate of 1 mL/min and with a refractive index (RI) detector. The columns were calibrated using polystyrene standards Easivials PS-H from Polymer Laboratories. The data were processed using Cirrus software from Polymer Labs.

Samples were prepared by dissolving an amount of polymer solution corresponding to 25 mg dry polymer in 5 mL THF. The samples were kept for minimum 3 hours at room temperature prior to sampling for the GPC measurements.

The weight-average molecular weight (Mw), the number-average molecular weight (Mn) and the polydispersity index (PDI), given as Mw/Mn, are reported in the tables.

Determination of the Glass Transition Temperature

The glass transition temperature (Tg) is obtained by Differential Scanning calorimetry (DSC) measurements. The DSC measurements were performed on a TA Instruments DSC Q200. Samples were prepared by transferring a small amount of polymer solution to an aluminium pan and dry the samples for minimum 10 h at 50° C. and 1 h at 150° C. The samples of approx. 10 mg dry polymer material were measured in open aluminum pans and scans were recorded at a heating and cooling rate of 10° C./min with an empty pan as reference. The onset value of the glass transition of the second heating is reported as the Tg of the polymers.

EXAMPLE 1

General Procedure for Preparation of Polyoxalates by Transesterification in Melt 100 g of starting materials comprising a mixture of 1.0 mole eq. of diethyl oxalate or a mixture of diethyl oxalate and a dicarboxylic acid ester, 1.0 mole eq. of one or more diols and 0.02 mole eq. of catalyst are charged into a 500 ml three-necked glass flask equipped with magnetic stirrer, thermometer, condenser and nitrogen inlet. The mixture is heated slowly under nitrogen to 190° C. on a temperature controlled oil bath while the condensate is distilled. The heating rate is controlled so that the temperature in the outlet does not exceed the boiling point of the condensate. The temperature is maintained at 190° C. until 80-90% of the theoretical amount of condensate is collected. The nitrogen inlet is closed and vacuum is applied. The vacuum is adjusted gradually down to 0.1 mbar. The temperature is maintained at 190° C. for 2-4 hours. The polymer melt is cooled to approx. 100° C. under vacuum. The vacuum is removed and solvent is added. The polymer solution is cooled to room temperature.

The polyoxalates PO-1 to PO-4 in Table 1 are prepared according to this procedure.

TABLE 1

Ingredients and properties of polyoxalate solutions PO-1 to PO-4

| | | | PO-1 | PO-2 | PO-3 | PO-4 |
|---|---|---|---|---|---|---|
| Reactor charge (g) | Dicarboxylic acid esters | Diethyl oxalate | 54.06 | 50.13 | 50.09 | 30.14 |
| | | Dimethyl isophthalate | — | — | — | 21.56 |
| | Diols | 1,4-Cyclohexanedimethanol | 26.67 | 21.27 | 14.83 | 22.88 |
| | | Neopentyl glycol | 19.26 | — | — | — |
| | | 2,2,4-Trimethyl-1,3-pentanediol | — | 28.59 | 35.08 | — |
| | | 2-Butyl-2-ethyl-1,3-propanediol | — | — | — | 25.42 |
| | | 1,6-Hexanediol | — | — | — | — |
| | Catalyst | Dibutyltin oxide | 0.0376 | 0.0349 | 0.0348 | 0.0322 |
| Thinning (g) | Solvent | Xylene | 43.94 | 45.59 | 45.61 | 49.25 |
| Properties of polymer solutions | Theoretical NVM (wt %) | | 60 | 60 | 60 | 60 |
| | Actual NVM (wt %) | | 59.4 | 58.1 | 57.2 | 59.5 |
| | Viscosity (cP) | | 7,050 | 2,200 | 1,250 | 2,750 |
| | Mw (×1000) | | 24.1 | 23.4 | 18.6 | 12.8 |

TABLE 1-continued

Ingredients and properties of polyoxalate solutions PO-1 to PO-4

|  | PO-1 | PO-2 | PO-3 | PO-4 |
|---|---|---|---|---|
| Mn (×1000) | 8.3 | 5.6 | 4.7 | 5.0 |
| PDI | 2.9 | 4.2 | 4.0 | 2.6 |
| Tg (° C.) | 15 | 15 | 12 | 14 |

EXAMPLE 2

General Procedure for Preparation of Polyoxalates by Transesterification in Melt 250 g of starting materials comprising a mixture of 1.0 mole eq. of diethyl oxalate or a mixture of diethyl oxalate and a dicarboxylic acid ester, 1.05 mole eq. of one or more diols and 0.02 mole eq. of catalyst are charged into a 250 ml temperature controlled reactor vessel equipped with mechanical stirrer, thermometer, condenser and nitrogen inlet. The mixture is heated slowly under nitrogen to 190° C. while the to condensate is distilled. The heating rate is controlled so that the temperature in the outlet does not exceed the boiling point of the condensate. The pre-polymerisation reaction is run until 80-90% of the theoretical amount of condensate is collected. The nitrogen inlet is closed and vacuum is applied. The vacuum is adjusted gradually down to 100 mbar. The temperature and vacuum is maintained for 3 hours. The polymer melt is cooled to approx. 100° C. under vacuum. The vacuum is removed and solvent is added. The polymer solution is cooled to room temperature.

The polyoxalates PO-5 to PO-19 in Table 2 are prepared according to this procedure.

TABLE 2

Ingredients and properties of polyoxalate solutions PO-5 to PO-19

| | | | PO-5 | PO-6 | PO-7 | PO-8 | PO-9 | PO-10 | PO-11 | PO-12 | PO-13 |
|---|---|---|---|---|---|---|---|---|---|---|---|
| Reactor charge (g) | Dicarboxylic acid esters | Diethyl oxalate | 122.19 | 118.83 | 119.25 | 124.20 | 116.05 | 119.67 | 117.23 | 135.05 | 131.46 |
| | | Dimethyl-isophthalate | — | — | — | — | — | — | — | — | — |
| | Diols | 1,4-Cyclohexane-dimethanol | 63.46 | — | 61.93 | — | — | 37.29 | — | — | — |
| | | Neopentyl glycol | — | — | — | 32.61 | — | 31.42 | 21.99 | 50.66 | — |
| | | 2,2,4-Trimethyl-1,3-pentanediol | 64.35 | 62.58 | — | — | — | — | — | 35.56 | — |
| | | 2-Butyl-2-ethyl-1,3-propanediol | — | 68.58 | 68.82 | 93.19 | 133.95 | — | 67.66 | — | 131.46 |
| | | Hydroxypivalyl hydroxypivalate | — | — | — | — | — | 61.62 | 43.12 | — | — |
| | | 1,6-Hexanediol | — | — | — | — | — | — | — | 28.74 | — |
| | | 1,4-Butanediol | — | — | — | — | — | — | — | — | 42.67 |
| | Catalyst | Dibutyltin oxide | 0.0872 | 0.0848 | 0.0851 | 0.0886 | — | — | — | 0.0964 | — |
| | | Titanium(IV) butoxide | — | — | — | — | 0.1144 | 0.1179 | 0.1456 | — | 0.1296 |
| Thinning (g) | Solvent | Xylene | 74.13 | 75.03 | 74.92 | 73.58 | 75.79 | 74.81 | 75.47 | 70.65 | 71.62 |
| Properties of polymer solutions | Theoretical NVM (wt %) | | 70 | 70 | 70 | 70 | 70 | 70 | 70 | 70 | 70 |
| | Actual NVM (wt %) | | 65.7 | 65.5 | 67.8 | 67.1 | 66.4 | 67.6 | 67.1 | 64.8 | 66.4 |
| | Viscosity (cP) | | 470 | 125 | 1067 | 285 | 235 | 495 | 200 | 250 | 310 |
| | Mw (×1000) | | 4.7 | 3.5 | 6.4 | 3.9 | 3.8 | 4.1 | 3.6 | 4.4 | 5.8 |
| | Mn (×1000) | | 2.2 | 1.6 | 2.7 | 1.8 | 1.8 | 2.2 | 1.8 | 1.9 | 2.5 |
| | PDI | | 2.2 | 2.1 | 2.4 | 2.1 | 2.2 | 1.9 | 2.0 | 2.3 | 2.3 |
| | Tg (° C.) | | 9 | −9 | 2 | −9 | −13 | −1 | −9 | −15 | −20 |

| | | | PO-14 | PO-15 | PO-16 | PO-17 | PO-18 | PO-19 |
|---|---|---|---|---|---|---|---|---|
| Reactor charge (g) | Dicarboxylic acid esters | Diethyl oxalate | 128.06 | 132.67 | 140.37 | 135.83 | 120.96 | 70.65 |
| | | Dimethyl isophthalate | — | — | — | — | — | 54.76 |
| | Diols | 1,4-Cyclohexanedimethanol | — | — | — | — | — | 40.67 |
| | | Neopentyl glycol | — | 29.86 | 31.59 | — | — | — |
| | | 2,2,4-Trimethyl-1,3-pentanediol | 67.44 | — | — | — | — | — |
| | | 2-Butyl-2-ethyl-1,3-propanediol | — | 53.60 | — | — | 62.83 | 83.93 |
| | | Hydroxypivalyl hydroxypivalate | — | — | — | — | — | — |
| | | 1,6-Hexanediol | 54.50 | 33.88 | — | — | 46.33 | — |
| | | 1,4-Butanediol | — | — | 27.34 | 44.09 | — | — |
| | | 2-Ethyl-1,3-hexanediol | — | — | 50.70 | 70.08 | — | — |
| | | Bisphenol A | — | — | — | — | 7.96 | — |
| | Catalyst | Dibutyltin oxide | 0.0914 | — | 0.0976 | 0.0969 | — | 0.0798 |
| | | Titanium(IV) butoxide | — | 0.1274 | — | — | — | — |
| | | Tin(II) 2-ethylhexanoate | — | — | — | — | 0.1377 | — |
| Thinning (g) | Solvent | Xylene | 72.54 | 71.29 | 69.21 | 70.44 | 67.01 | 80.31 |
| Properties of polymer solutions | Theoretical NVM (wt %) | | 70 | 70 | 70 | 70 | 70 | 70 |
| | Actual NVM (wt %) | | 64.8 | 68.1 | 65.4 | 64.4 | 69.3 | 65.9 |
| | Viscosity (cP) | | 200 | 350 | 240 | 173 | 338 | 490 |
| | Mw (×1000) | | 4.6 | 5.5 | 4.2 | 3.7 | 5.7 | 3.5 |

TABLE 2-continued

| Ingredients and properties of polyoxalate solutions PO-5 to PO-19 | | | | | | |
|---|---|---|---|---|---|---|
| Mn (×1000) | 2.0 | 2.4 | 2.0 | 1.8 | 2.5 | 2.0 |
| PDI | 2.3 | 2.3 | 2.2 | 2.0 | 2.2 | 1.8 |
| Tg (° C.) | −30 | −22 | −17 | −25 | −27 | 9 |

EXAMPLE 3

Procedure for Preparation of Polyoxalates by Esterification in Melt 54.0 g of oxalic acid, 45.5 g of 1,4-cyclohexanedimethanol, 50.5 g of 2-butyl-2-ethyl-1,3-propanediol, 0.498 g of tin(II) 2-ethylhexanote and 5.0 g of xylene were charged into a 250 ml temperature controlled reactor vessel equipped with mechanical stirrer, thermometer, condenser, water trap and nitrogen inlet. The mixture is heated slowly under nitrogen until reflux. The temperature was adjusted continuously to maintain the reflux until the temperature in the reactor vessel reached 210° C. The temperature was kept at 210° C. for 3.5 hours. Approx. 90% of the theoretical amount of water was collected in the water trap. The polymer melt was cooled to approx. 100° C. and 85.9 g of xylene was added. The polymer solution was cooled to room temperature.

The obtained polyoxalate had Mw of 2,800, PDI of 1.9.

EXAMPLE 4

General Procedure for Preparation of Antifouling Coating Composition

The ingredients are mixed and ground to a fineness of <30 µm using a high-speed disperser. Any ingredients sensitive to the high shear forces and temperature in the grinding process are added in the let-down. The compositions of the prepared coating compositions are presented in Table 3 and Table 4. Any curing agent and accelerator are mixed with the coating composition just before use.

Determination of the Viscosity of the Antifouling Coating Composition

The high-shear viscosity of the antifouling coating composition is determined in accordance with ASTM D4287 using a cone-plate viscometer.

Calculation of the Volatile Organic Compound (VOC) Content of the Antifouling Coating Composition The volatile organic compound (VOC) content of the antifouling coating composition is calculated in accordance with ASTM D5201.

Determination of Polishing Rates of Antifouling Coating Films in Sea Water

The polishing rate is determined by measuring the reduction in film thickness of a coating film over time. For this test PVC disc are used. The coating compositions are applied as radial stripes on the disc using a film applicator. The thickness of the dry coating films are measured by means of a suitable electronic film thickness gauge. The PVC discs are mounted on a shaft and rotated in a container in which seawater is flowing through. Natural seawater which has been filtered and temperature-adjusted to 25° C.±2° C. is used. The PVC discs are taken out at regular intervals for measuring the film thickness. The discs are rinsed and allowed to dry overnight at room temperature before measuring the film thickness.

TABLE 3

| Ingredients in parts by weight of physically drying coating compositions C-1 to C-3 | | | | |
|---|---|---|---|---|
| | | C-1 | C-2 | C-3 |
| Binder | Polyoxalate solution | PO-1 | PO-3 | PO-4 |
| | | 30.68 | 31.85 | 30.63 |
| Biocides | Cuprous oxide | 36.72 | 36.71 | 36.72 |
| | Copper pyrithione | 1.35 | 1.35 | 1.35 |
| Pigments | Iron oxide red | 1.21 | 1.21 | 1.21 |
| | Titanium dioxide | 1.18 | 1.18 | 1.18 |
| Extenders | Zinc oxide red seal | 0.97 | 0.97 | 0.97 |
| | Barium sulfate | 9.57 | 9.57 | 9.57 |
| | Nepheline syenite | 2.95 | 2.95 | 2.95 |
| Dehydrating agent | Calcium sulfate | 1.36 | 1.36 | 1.36 |
| Thixotropic agents | Disparlon A603-20X[(1)] | 1.92 | 1.92 | 1.92 |
| | Disparlon 4401-25X[(2)] | 0.88 | 0.88 | 0.88 |
| Solvents | Xylene | 5.46 | 4.30 | 5.51 |
| | Solvesso 100 | 5.75 | 5.75 | 5.75 |
| Coating properties | Viscosity (cP) | 620 | 200 | 260 |
| | Calculated VOC (g/L) | 450 | 450 | 450 |
| | Polishing rate (µm/month) | 5.1 | 2.3 | 2.1 |

[(1)]Disparlon A603-20X is an amide wax, 20% in xylene; produced by Kusumoto Chemicals, Ltd.
[(2)]Disparlon 4401-25X is a polyethylene wax, 25% in xylene; produced by Kusumoto Chemicals, Ltd.

TABLE 4

| Ingredients in parts by weight of 2-component curable coating compositions C-4 to C-9 | | | | | | | |
|---|---|---|---|---|---|---|---|
| | | C-4 | C-5 | C-6 | C-7 | C-8 | C-9 |
| Binder | Polyoxalate solution | PO-5 | PO-6 | PO-7 | PO-8 | PO-9 | PO-11 |
| | | 27.57 | 26.43 | 27.67 | 26.38 | 26.39 | 26.40 |
| Biocides | Cuprous oxide | 39.63 | 39.62 | 39.77 | 39.75 | 39.63 | 39.74 |
| | Copper pyrithione | 1.59 | 1.60 | 1.61 | 1.61 | 1.59 | 1.61 |
| Pigments | Iron oxide red | 1.96 | 1.97 | 1.98 | 1.98 | 1.96 | 1.98 |
| | Titanium dioxide | 1.00 | 1.00 | 1.00 | 1.00 | 1.00 | 1.00 |
| Extenders | Barium sulfate | 7.44 | 7.44 | 7.46 | 7.46 | 7.44 | 7.46 |
| | Magnesium carbonate | 5.18 | 5.18 | 5.20 | 5.19 | 5.17 | 5.19 |
| | Nepheline syenite | 2.83 | 2.84 | 2.85 | 2.85 | 2.82 | 2.85 |
| Dehydrating agents | Calcium sulfate | 1.20 | 1.21 | 1.21 | 1.21 | 1.20 | 1.21 |
| Thixotropic agents | Disparlon A603-20X[(1)] | 2.09 | 2.08 | 2.08 | 2.08 | 2.09 | 2.08 |
| | Disparlon 4401-25X[(2)] | 0.52 | 0.53 | 0.53 | 0.53 | 0.52 | 0.53 |
| Solvents | Xylene | 4.64 | 4.65 | 5.02 | 4.96 | 5.02 | 4.95 |

TABLE 4-continued

Ingredients in parts by weight of 2-component curable coating compositions C-4 to C-9

|  |  | C-4 | C-5 | C-6 | C-7 | C-8 | C-9 |
|---|---|---|---|---|---|---|---|
| Curing agent (comp. B) | Desmodur N 75 BA[3] | 4.37 | 5.47 | 3.61 | 5.01 | 5.17 | 5.01 |
| Accelerator | Dibutyltin dilaurate | 250 ppm | 250 ppm | 250 ppm | 250 ppm | 350 ppm | 350 ppm |
| Coating properties | Calculated VOC (g/L) | 335 | 335 | 335 | 335 | 335 | 335 |
|  | Polishing rate (μm/month) | 3.7 | 3.6 | 3.0 | 4.4 | 2.8 | 5.2 |

[1]Disparlon A603-20X is an amide wax, 20% in xylene; produced by Kusumoto Chemicals, Ltd.
[2]Disparlon 4401-25X is a polyethylene wax, 25% in xylene; produced by Kusumoto Chemicals, Ltd.
[3]Desmodur N 75 BA is an aliphatic polyisocyanate resin based on hexamethylene diisocyanate (HDI), 75% in butyl acetate; produced by Bayer Material Science AG.

The polishing rate of the reference paint was 2.3 μm/month when tested in parallel with the coatings in Table 3 and Table 4. The reference paint is SeaQuantum Classic light red from Jotun AS, which is a high performance self-polishing antifouling coating, based on a hydrolysing organosilyl polymer as binder.

The data shows that an antifouling system comprising a polyoxalate binder is self-polishing. The self-polishing allows a controlled leaching of biocide that would keep a surface free of marine organisms. Our results show that the polyoxalate binder of this invention polishes faster than a reference commercial silyl ester copolymer binder containing fouling composition.

A faster polishing system may be advantageously utilised on stationary installations or vessels that move slowly (e.g. less than 10 knots) and/or that operate in cold water (e.g. less than 10° C.) since the hydrolysis rate is dependent on temperature.

The invention claimed is:

1. A marine antifouling coating composition comprising at least one hydrolyzable polyoxalate and at least one compound that prevents the settlement of marine organisms on a surface and/or prevents the growth of marine organisms on a surface and/or encourages the dislodgement of marine organisms from a surface, where the polyoxalate comprises a polycondensation reaction product of a dialkyl oxalate with at least one diol.

2. An antifouling coating composition according to claim 1, characterised in that the molar ratio in the polycondensation reaction between the dialkyl oxalate or derivative thereof and diol is less than 2.0 and more than 0.5, more preferably not above 1.0.

3. An antifouling coating composition according to claim 1, characterised in that the diol is saturated and aliphatic.

4. An antifouling coating composition according to claim 1, characterised in that aromatic diols comprise 50 mol % or less of the total amount of diols used in the polycondensation reaction, more preferred not above 30 mol %, most preferred not above 10 mol %.

5. An antifouling coating composition according to claim 1, characterised in that unsaturated aliphatic diols comprise 10 mol % or less of total amount of diols used in the polycondensation reaction.

6. An antifouling coating composition according to claim 1, characterised in that the polyoxalate comprises repeating units derived from polyols with more than two hydroxyl groups.

7. An antifouling coating composition according to claim 6, wherein polyols form 10 mol % or less of the total amount of diols and polyols present in the polycondensation reaction.

8. An antifouling coating composition according to claim 1, characterised in that the polyoxalate comprises one or more units obtained by the polycondensation reaction of a diamine, dicarboxylic acid or derivatives thereof or hydroxyl functional carboxylic acid or derivatives thereof.

9. An antifouling coating composition according to claim 1 characterised in that the polyoxalate has a weight average molecular weight (Mw) from 1 000 to 40,000.

10. An antifouling coating composition according to claim 1, comprising one or more solvents, e.g. xylene.

11. Antifouling coating composition according to claim 1, characterised in that it further includes one or more additives selected from biologically active compounds, other binders, plasticizers, pigments, extenders, fillers, dehydrating agents, drying agents, curing agents, thixotropic agents, thickening agents, anti-settling agents, reinforcing agents, thinners and additional solvents.

12. Antifouling coating composition according to claim 1, characterised in that it is a physical drying coating composition.

13. Antifouling coating composition according to claim 1, characterised in that it is a curing coating composition.

14. Antifouling coating composition according to claim 1, characterised in that the polyoxalate has hydroxy-functional end-groups, and the composition comprises a curing agent selected from isocyanates, polymeric isocyanates and isocyanate prepolymers.

15. Antifouling coating composition according to claim 1, characterised in that the polyoxalate has epoxy-functional end-groups and the composition comprises a curing agent is selected from amines and polyamines.

16. Antifouling coating composition according to claim 1, characterised by a content of solids of not less than 50% by weight.

17. Antifouling coating composition according to claim 1, characterised in that it has a volatile organic compounds (VOC) content below 400 g/L.

18. Antifouling coating composition according to claim 1, wherein the at least one polyoxalate is amorphous.

19. A kit comprising (I) a marine anti-fouling coating composition comprising at least one polyoxalate and (II) at least one curing agent.

20. Antifouling coating composition according to claim 1, wherein the polyoxalate is produced by the condensation polymerisation of at least one oxalic acid or derivative thereof and at least two diols wherein at least one of said diols is a saturated branched diol having up to 20 carbon atoms.

21. An object coated with a marine antifouling coating as claimed in claim 1.

22. A process for protecting an object from fouling comprising coating at least a part of said object with a marine anti-fouling coating as claimed in claim 1.

23. A self-polishing marine anti-fouling coating composition as claimed in claim 1 which is curable or which has been cured.

24. An antifouling composition according to claim 1, wherein the compound is selected from copper, copper oxide, copper thiocyanate, copper pyrithione, 2-(tert-butylamino)-4-(cyclopropylamino-6-(methylthio)-1,3,5-triazine), 4,5-dichloro-2-n-octyl-4-isothiazolin-3-one, N-dichlorofluoromethylthio-N',N'-dimethyl-N-phenylsulfaminde, N-dichlorofluoromethylthio-N',N'-dimethyl-N-p-tolylsulfamide, zinc pyrithione, zinc ethylenebis(dithiocarbamate) and medetomidine.

25. An antifouling composition according to claim 1, wherein the dialkyl oxalate is dimethyl oxalate or diethyl oxalate.

* * * * *